(12) United States Patent
Decker et al.

(10) Patent No.: US 9,358,899 B2
(45) Date of Patent: Jun. 7, 2016

(54) METHOD FOR REVITALIZING AND INCREASING LITHIUM ION BATTERY CAPACITY

(71) Applicant: Ford Global Technologies, LLC, Dearborn, MI (US)

(72) Inventors: Edward Vann Decker, Dearborn, MI (US); Chi Paik, Brownstown Township, MI (US); Dawn Bernardi, Sterling Heights, MI (US); William T. Moore, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 14/309,375

(22) Filed: Jun. 19, 2014

(65) Prior Publication Data

US 2015/0367747 A1    Dec. 24, 2015

(51) Int. Cl.
*H02J 7/00* (2006.01)
*B60L 11/18* (2006.01)

(52) U.S. Cl.
CPC ........... *B60L 11/1862* (2013.01); *H02J 7/0063* (2013.01)

(58) Field of Classification Search
CPC ................... H02J 7/0063; B60L 11/1862
USPC .................. 320/136, 134, 135, 130, 131
See application file for complete search history.

(56) References Cited

U.S. PATENT DOCUMENTS

| | | | |
|---|---|---|---|
| 5,625,272 A | 4/1997 | Takahashi | |
| 6,362,601 B1 | 3/2002 | Finger | |
| 7,737,659 B2 * | 6/2010 | Morioka | H02J 7/0081 320/128 |
| 8,854,012 B2 * | 10/2014 | Dai | H02J 7/041 320/130 |
| 2002/0060554 A1 * | 5/2002 | Odaohhara | H02J 7/0073 320/134 |
| 2003/0112011 A1 * | 6/2003 | Guiheen | G01R 31/3624 324/429 |
| 2006/0238203 A1 * | 10/2006 | Kelley | G01R 31/3679 324/433 |
| 2007/0114971 A1 * | 5/2007 | Uesaka | G01R 31/3624 320/132 |
| 2007/0118255 A1 | 5/2007 | Wakashiro et al. | |
| 2007/0145949 A1 * | 6/2007 | Matsushima | H02J 7/00 320/132 |
| 2008/0311464 A1 * | 12/2008 | Krause | H01M 4/38 429/50 |
| 2010/0052618 A1 | 3/2010 | Inoue et al. | |
| 2011/0236751 A1 * | 9/2011 | Amiruddin | H01M 4/0447 429/188 |
| 2011/0309798 A1 * | 12/2011 | Hara | H01M 4/131 320/134 |
| 2011/0309799 A1 * | 12/2011 | Firehammer | H02J 7/0016 320/134 |
| 2012/0212186 A1 * | 8/2012 | Fujii | H02J 7/0075 320/137 |
| 2012/0293131 A1 * | 11/2012 | Nakamura | G01R 31/361 320/134 |
| 2012/0319659 A1 * | 12/2012 | Kinoshita | H01M 4/525 320/134 |
| 2013/0076363 A1 * | 3/2013 | Takahashi | G01R 31/3634 324/427 |
| 2013/0257382 A1 * | 10/2013 | Field | H01M 10/44 320/134 |
| 2014/0361747 A1 * | 12/2014 | Bouyssou | H02J 7/0075 320/128 |
| 2015/0105948 A1 * | 4/2015 | Chang | B60L 15/2009 701/22 |
| 2015/0202985 A1 * | 7/2015 | Le | B60L 11/1877 307/9.1 |

FOREIGN PATENT DOCUMENTS

| | | | | |
|---|---|---|---|---|
| CN | 102694211 A | 9/2012 | | |
| JP | 11098712 A | * | 4/1999 | ............... H02J 7/04 |
| JP | 2013132185 A | * | 7/2013 | ............... H02J 7/04 |

* cited by examiner

*Primary Examiner* — Phallaka Kik
(74) *Attorney, Agent, or Firm* — David Kelley; Brooks Kushman P.C.

(57) ABSTRACT

A hybrid or electric vehicle includes a lithium-ion battery and a controller. The controller is programmed to discharge the battery through an electrical load to a predetermined voltage less than a voltage associated with zero state of charge such that relative degrees of lithiation associated with the electrodes of the battery change for at least one state of charge resulting in an increase in battery maximum capacity. The controller may be on-board or off-board of the vehicle. The electrical load may be part of the vehicle or external to the vehicle.

20 Claims, 6 Drawing Sheets

FIG. 6

METHOD FOR REVITALIZING AND INCREASING LITHIUM ION BATTERY CAPACITY

TECHNICAL FIELD

This application generally relates to increasing battery charge capacity of a lithium ion battery.

BACKGROUND

Hybrid and electric vehicles depend on a traction battery to supply energy for propulsion and accessory loads. The traction battery may be made from a variety of chemical formulations. A traction battery may be made from a lithium-ion compound. A characteristic of a lithium-ion battery is that the capacity of the battery tends to decrease as the battery ages. Over time, the battery may be subjected to repeated charge and discharge cycles. As battery charge capacity decreases, less energy is stored in the battery which may lead to a decrease in vehicle performance. For example, an electric vehicle may experience less range on a full charge. A hybrid vehicle may experience a decrease in fuel economy as the gasoline engine may need to be operating longer.

SUMMARY

A method for operating a lithium-ion battery includes, in response to a loss of battery charge capacity greater than a predetermined loss, discharging, by a controller, the battery to a predetermined voltage less than a voltage associated with zero state of charge such that relative degrees of lithiation associated with positive and negative electrodes of the battery change for at least one state of charge resulting in an increase in the battery charge capacity. The predetermined voltage may be greater than zero volts by a predetermined amount. The predetermined loss may be a predetermined percentage of a beginning of life battery charge capacity. A current for discharging the battery may be substantially less than a rated current of the battery. The method may include connecting, by the controller, a power source to the battery and charging the battery to a voltage that is a predetermined amount greater than the voltage associated with zero state of charge.

A vehicle includes a battery that includes a plurality of lithium-ion cells with associated positive and negative electrodes. The vehicle includes at least one controller programmed to discharge the battery through an electrical load to a predetermined voltage less than a voltage associated with zero state of charge such that relative degrees of lithiation associated with the electrodes of the battery change for at least one state of charge resulting in an increase in battery maximum capacity. The vehicle may further include an engine, a generator coupled to the engine and at least one controller may be further programmed to, in response to the voltage of the battery being less than the predetermined voltage, operate the generator and the engine to charge the battery until the voltage of the battery is a predetermined amount greater than the voltage associated with zero state of charge. The vehicle may further include a charge port connecting an external power source to the vehicle and wherein the at least one controller may be further programmed to operate the external power source to charge the battery until the voltage of the battery is a predetermined amount greater than the voltage associated with zero state charge. The charge port may connect the electrical load to the vehicle. The vehicle may further include one or more of a resistor, a heater, a compressor, and a motor, connectable to the battery as the electrical load. The predetermined voltage may be greater than zero volts by a predetermined amount. The at least one controller may be further programmed to discharge the battery in response to a loss of battery maximum capacity greater than a predetermined loss.

An apparatus for operating a lithium-ion battery includes at least one controller programmed to connect an electrical load to the battery and discharge the battery to a predetermined voltage less than a voltage associated with zero state of charge such that relative degrees of lithiation associated with positive and negative electrodes of the battery change for at least one state of charge resulting in an increase in battery maximum capacity. The apparatus may include a power output selectively connectable to the battery, and the at least one controller may be further programmed to, disconnect the electrical load, and connect the power output to the battery and recharge the battery using the power output until a battery voltage is a predetermined voltage greater than the voltage associated with zero state of charge. An impedance of the electrical load may be selected such that a current is substantially less than a rated current of the lithium-ion battery. The predetermined voltage may be greater than zero volts by a predetermined amount. The at least one controller may be further programmed to connect the electrical load in response to a loss of battery maximum capacity greater than a predetermined loss. The predetermined loss may be a predetermined percentage of a beginning of life battery charge storage capacity. The at least one state of charge may be zero state of charge. The at least one controller may be further programmed to connect the electrical load in response to a battery state of charge being less than a predetermined state of charge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
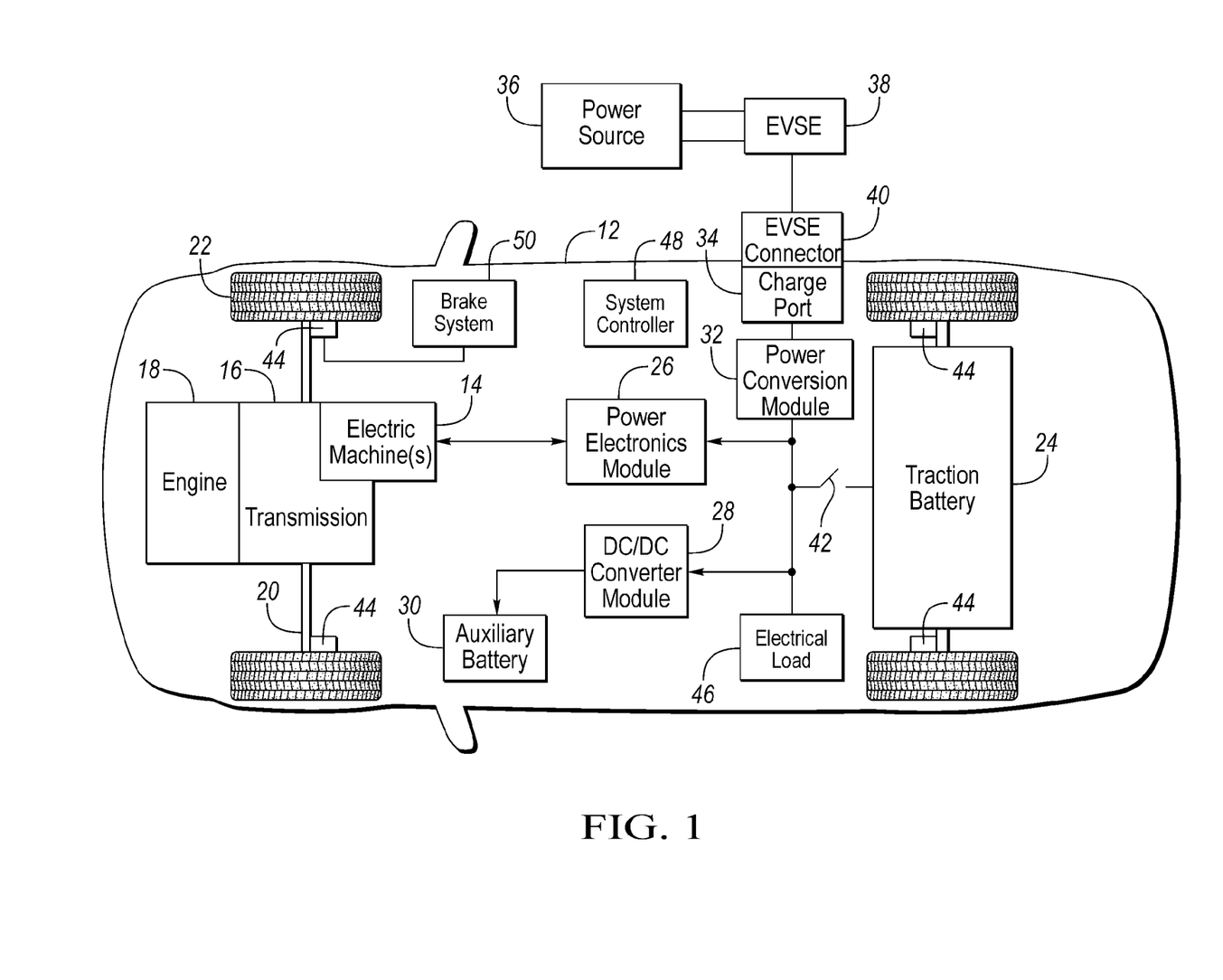
FIG. 1 is a diagram of a hybrid vehicle illustrating typical drivetrain and energy storage components.

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors 42 may isolate the traction battery 24 from other components when opened and connect the traction battery 24 to other components when closed. A power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be utility power from a connection to an electrical outlet. The external power source 36 may be electrically connected to electric vehicle supply equipment (EVSE) 38. The EVSE 38 may include a controller (200 FIG. 5) to manage charging operations. The EVSE 38 may provide circuitry and controls to regulate and manage the transfer of energy between the power source 36 and the vehicle 12. The external power source 36 may provide DC or AC electric power to the EVSE 38. The EVSE 38 may include a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
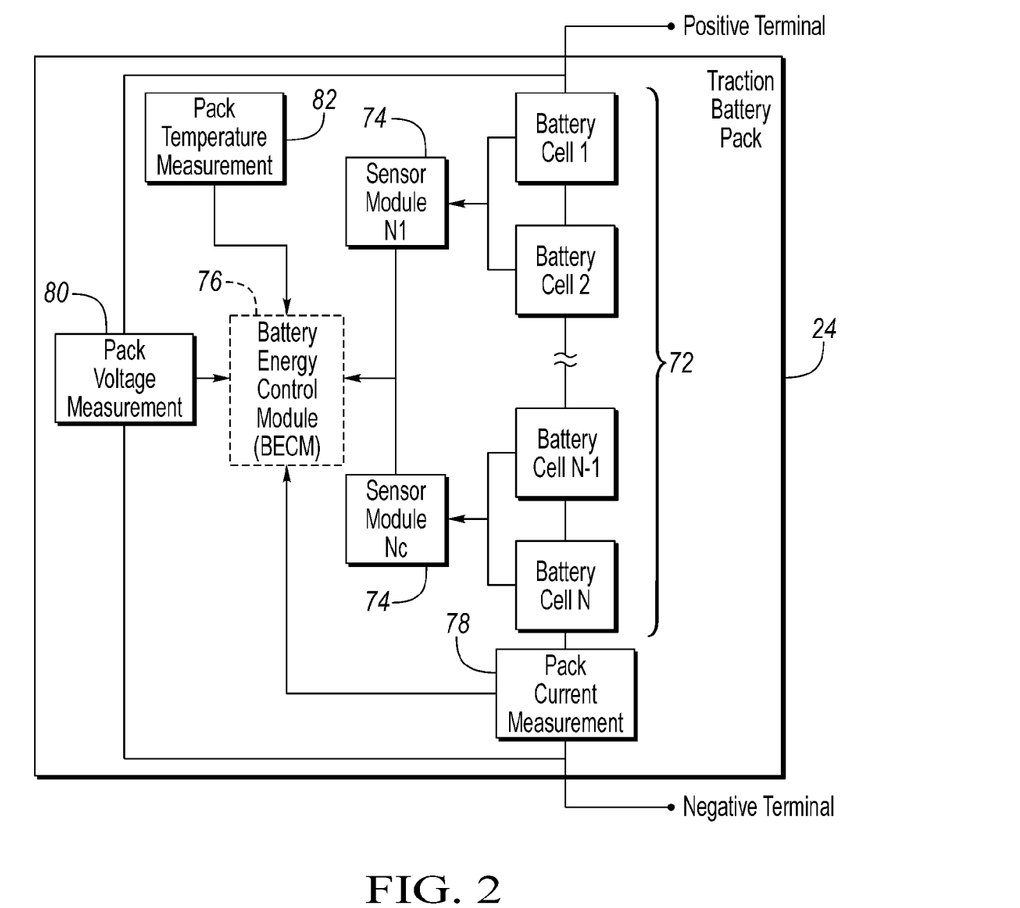
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A typical system may have one or more controllers, such as a Battery Energy Control Module (BECM) 76 that monitors and controls the performance of the traction battery 24. The BECM 76 may monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

It may be useful to calculate various characteristics of the battery pack 24. Quantities such a battery charge capacity (also referred to as battery capacity) and battery state of charge may be useful for controlling the operation of the battery pack 24 and electrical loads 46 that receive power from the battery pack. Battery charge capacity may refer to the amount of charge that can be stored in the battery 24. The battery charge capacity may be measured in units of Amp-hours. As an analogy to a vehicle fuel system that includes a fuel tank, the battery charge capacity can be thought of as the size of the fuel tank. Battery charge capacity may be analogous to the maximum amount of fuel that can be stored at a given time.

Battery state of charge is the amount of charge stored in the battery 24 at a given time or the amount of battery charge capacity that is presently utilized. Battery state of charge may be analogous to the amount of fuel that is in the fuel tank at a given time. Battery state of charge is similar to a fuel gauge indicating how much fuel is currently in the fuel tank. Battery state of charge may be expressed in terms of a percentage of the battery charge capacity. When the battery 24 is charged to its capacity, the state of charge may be 100 percent.

The battery charge capacity may decrease over time. Over time, various chemical reactions in the battery 24 may cause the battery charge capacity to decrease. Repeated charging and discharging of the battery 24 may cause changes in components within the battery 24. As battery charge capacity falls below some threshold, the battery 24 may be less useful for automotive purposes. A decrease in battery charge capacity may lead to a decrease in range for electric vehicles. The decrease may lead to decreased performance in hybrid-electric vehicles. Hybrid and electric vehicle battery packs 24 may be expensive components. Once the battery charge capacity has decreased below a predetermined capacity the battery 24 may be replaced in order to restore performance to original levels. A less expensive approach might be to rejuvenate the battery 24 such that some or all of the battery charge capacity is restored.

There are many battery charge capacity estimation algorithms available. Battery charge capacity may be estimated as battery throughput divided by a difference in state of charge (SOC) values. This approach is based on knowledge of two separate SOC values obtained independent of battery charge capacity. The battery charge capability may be calculated as:

$$Q = \frac{\int_{Ti}^{Tf} i \, dt}{SOC_i - SOC_f} = \frac{\text{Throughput}}{SOC_i - SOC_f} \quad (1)$$

where $SOC_i$ and $SOC_f$ are the state of charge values at times $T_i$ and $T_f$ respectively and i is the current flowing to or from the battery. The battery throughput may be defined as the integral of battery current over a time period. When implemented in a controller, the integral may be replaced by a summation of current values multiplied by the sample time.

The state of charge values may be based on measured voltages sampled over two key-on/key-off cycles. For a lithium-ion battery, it is well-known that after the battery has been resting a sufficient time, the terminal voltage is approximately equal to the open-circuit voltage of the battery (i.e., $V_t = V_{oc}$). The terminal voltage may be measured at power-up and the state of charge may be derived from the open-circuit voltage (e.g., FIG. 3). The throughput may be calculated over each ignition cycle and stored in a non-volatile memory for use in the next ignition cycle.

The battery charge capacity may be calculated by an on-board battery controller (e.g., 76) by any available method. In addition, an external controller (200 FIG. 5) may calculate the battery charge capacity in a similar manner. For example, the external controller 200 may be connected to the vehicle 12 and the on-board controller (e.g., 76) during a service visit. The external controller 200 may command a discharge of current from the battery 24 and current may be measured during the discharge. In addition, a state of charge value may be estimated before and after the discharge. The battery charge capacity may then be calculated as described above.

Figure 5:
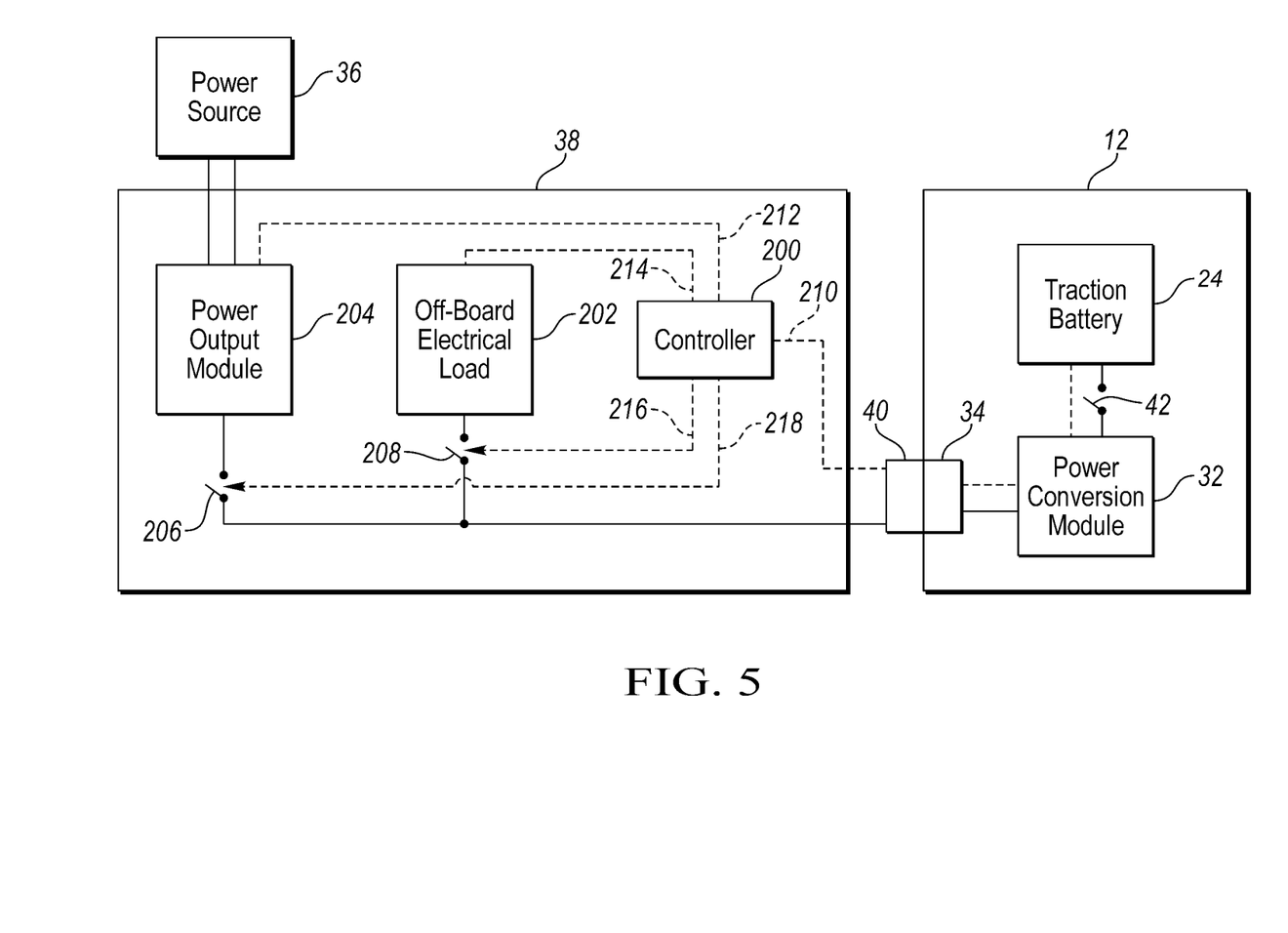
FIG. 5 is a diagram of a charging apparatus including an electrical load for discharging the battery connected to the vehicle.

The on-board controller (e.g., 76) may maintain a history of battery charge capacity values and may detect if the battery charge capacity is reduced from a maximum battery charge capacity. Likewise, the external controller 200 may maintain a history of battery charge capacity values for the vehicle 12 based on previous service visits. The history may be obtained from the on-board controller (e.g., 76) and/or may be calculated from a test discharge of the battery 24. Based on the history of battery charge capacity values, the controller (e.g., 76 or 200) may detect when capacity is reduced by a predetermined amount by comparing older values to the most recent.

Figure 3:
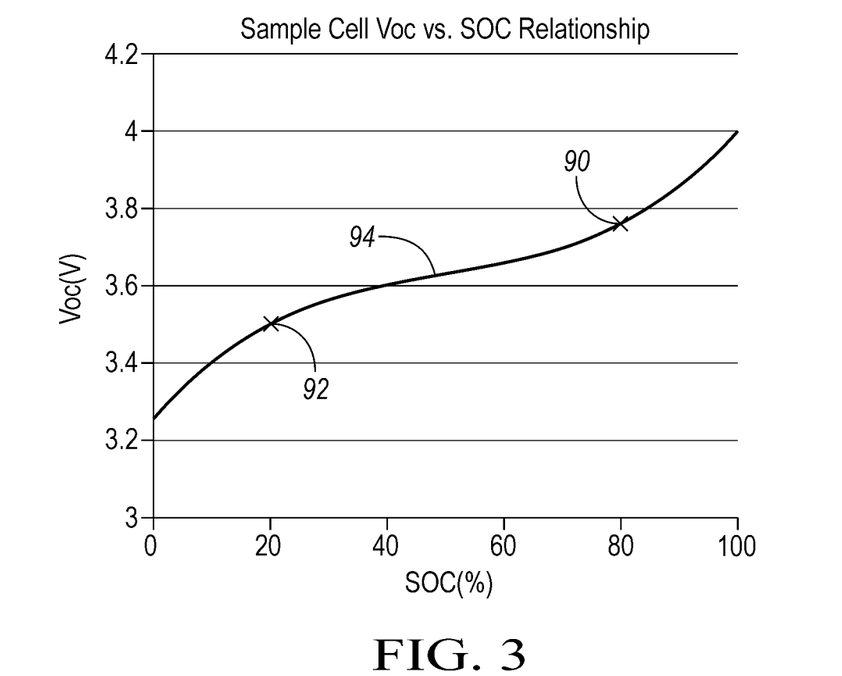
FIG. 3 is a graph that illustrates a possible open-circuit voltage (Voc) vs. battery state of charge (SOC) relationship for a typical battery cell.

A battery 24 may operate between 0 and 100 percent state of charge. A state of charge of 100% may indicate that the battery 24 is fully charged. The 100% state of charge level may be associated with a maximum voltage level of the battery 24. A state of charge of 0% may indicate that the battery 24 is fully discharged. FIG. 3 depicts a possible battery open-circuit voltage and state of charge relationship for a lithium-ion battery. The relationship may be determined using data from a battery manufacturer or from test data derived from experiments. The battery 24 with a 0% state of charge may still have some ability to provide power. The 0% state of charge level may be associated with a minimum voltage level of the battery 24, often referred to as the cut-off voltage. The cut-off voltage may be considered to be the voltage level associated with a 0% state of charge. During normal operation, the battery 24 is typically prevented from operating above the maximum voltage and below the minimum voltage level.

Minimum and maximum voltage levels may be specified by the battery cell manufacturer. These voltage levels may be defined to maximize the life of the battery cells. Battery control systems are typically designed to follow the cell manufacturer recommendations. That is, a battery control system will not intentionally operate a battery below the recommended cut-off voltage. Situations may occur, such as a vehicle 12 parked for a long period of time, in which the battery voltage may drop below the recommended cut-off voltage due to internal discharge processes of the battery 24.

A method of increasing the battery charge capacity of the lithium-ion battery 24 may include discharging the battery 24 below the recommended cut-off voltage. The discharge may be at a current substantially less than a rated current of the traction battery. After discharge, the battery 24 may be recharged. After recharging, the battery 24 may have an increased capacity.

A procedure for increasing lithium-ion battery charge capacity may be beneficial for increasing battery life. Battery life may be extended by performing the procedure when battery charge capacity is below a predetermined capacity. Rejuvinating the battery charge capacity may avoid expensive battery replacements and lead to improved customer satisfaction. In addition, warranty costs may decrease as batteries 24 may be rejuvenated instead of replaced when capacity has decreased. The procedure may be implemented as part of a scheduled maintenance procedure to ensure maximum battery charge capacity over vehicle life.

The controller (e.g., 200 or 76) may perform the battery rejuvenation procedure when the battery charge capacity has decreased below a predetermined capacity. A variety of factors may be used to select when to perform the rejuvenation procedure. For example, the controller (e.g, 200 or 76) may perform the procedure when the battery is near the end of life. The controller (e.g., 200 or 76) may ascertain the battery end of life by detecting a relatively large percentage decrease in battery charge capacity from a capacity determined at the beginning of battery life. Alternatively, the controller (e.g., 200 or 76) may ascertain the battery end of life as a time in service of the battery 24 or a number of miles traveled during the service of the battery 24. The procedure may be performed as a one-time event to prolong the battery life. The procedure may be performed on an as-needed basis. Alternatively, the procedure may be performed periodically to maintain a higher battery charge capacity for a longer period of time. For example, the procedure may be part of a periodic maintenance plan. After a predetermined number of miles (e.g., 10,000 miles), the controller (e.g., 200 or 76) may inspect the battery charge capacity to determine if the procedure is to be performed. The controller (e.g., 200 or 76) may perform the procedure opportunistically, such as when conditions are present in which the battery 24 is near the recommended cut-off voltage and connected to a charger.

The discharge of the battery 24 may be at a predetermined rate of discharge. The rate of charge or discharge of a battery 24 may be expressed as a C-rate. A 1-C discharge draws a current equal to the rated current capacity of the battery 24 and theoretically discharges the battery 24 from 100% state of charge to zero state of charge within one hour. The battery 24 may be considered fully discharged when the voltage is less than or equal to the voltage associated with 0% state of charge. Likewise, a 1-C charge rate provides a current equal to the rated current capacity of the battery 24 and theoretically charges the battery 24 to 100% state of charge within one hour. The battery 24 may be considered fully charged when the battery voltage is greater than or equal to the voltage level associated with 100% state of charge. A C-rate greater than one charges or discharges the battery 24 in less than one hour (e.g., 2-C=0.5 hours), while a C-rate less than one charges or discharges the battery 24 in more than one hour (e.g., 0.1-C=10 hours).

The battery rejuvenation procedure may be initiated by service personnel when the vehicle 12 is present for service. A battery charging controller 200 may monitor and control the charging equipment (e.g., 32, 38) and battery 24 to perform the procedure. The battery charging controller 200 may charge and discharge the battery 24. The battery charging controller 200 may first determine that the battery 24 may benefit from the procedure. This may be done by receiving the battery charge capacity value from the on-board battery controller 76. Alternatively, the battery charging controller 200 may calculate the battery charge capacity based on other inputs received from the on-board controller 76. If the battery charge capacity is below a predetermined threshold, the battery charging controller 200 may initiate the procedure. As discussed above, other criteria may be used for initiating the procedure.

The battery charging controller 200 may first ascertain the present state of charge of the battery 24. The state of charge may be ascertained by querying an on-board battery controller 76 or calculated based on battery voltages. The battery charging controller 200 may initiate a controlled discharge procedure. Battery discharge may be through the electrical loads 46 located on the vehicle 12 or off-board electrical loads (202 FIG. 5) external to the vehicle 12.

The battery charging equipment 38 may include a resistance element that may be switched across the terminals of the battery 24. When the resistance element is switched across the terminals of the battery 24, current may flow through the resistor. The resistance value may be selected to provide a selected current flow (e.g., rate of discharge). For example, to achieve a 1-C rate, the resistance value may be selected such that the rated battery current will flow. Alternatively, electrical loads 46 on the vehicle may be commanded to draw power at a predetermined level to achieve the discharge of the battery 24. The battery charging controller 200 may then monitor the battery voltage, current, and state of charge to determine when 0% state of charge is reached. The SOC may be calculated using an ampere-hour integration or estimated using an equivalent circuit model.

The rate of discharge may be selected to be much less than a 1-C rate. For example, a load (e.g., 46) may be connected to draw a current much less that the rated current from the battery 24 for an extended period of time. The rate may be selected to prevent detrimental side reactions within the battery 24. The impedance may be selected such that the current drawn by the load 46 is substantially less than the rated current of the battery 24. Lower currents may result in lower temperatures during the discharge process. The discharge rate may be selected to avoid Cu dissolution within the battery 24. The battery charging controller 200 may monitor the battery voltage and temperature during the over-discharge procedure. If the voltage or temperature indicate that the reactions are not occurring properly (e.g., Cu dissolution suspected), the discharge may be terminated.

The discharge rate chosen may impact the service approach. For example, a battery 24 swap procedure may be preferable when a discharge rate requiring days to discharge the battery 24 to the proper level is selected. The battery 24 may be removed from the vehicle and placed on an apparatus that restores the capacity. In order to maintain operation of the vehicle 12, another battery pack 24 that has already had capacity restored may be placed in the vehicle 12. Faster discharge rates requiring hours may be performed in a single service visit without removing the battery 24 from the vehicle. Different rates of discharge may affect the amount of capacity that may be restored.

It may be possible to automate the rejuvenation procedure to execute when the vehicle 12 is connected to the charging equipment 38. For example, a vehicle 12 may be connected to the charging equipment 38 when the battery voltage is near the zero percent state of charge voltage. In this situation, the discharge procedure may be performed for a period of time, after which charging may be initiated. Additional factors for executing the procedure may be the time at which the battery 24 is scheduled to be restored to a charge level for normal vehicle 12 operation. Projected vehicle operation time may be inferred by driver selected charging times or cabin preheating settings. The battery 24 may be discharged to a voltage below the normal cut-off voltage, but not necessarily to the optimal rejuvenating level. Repeating this procedure multiple times may restore small amounts of capacity each time.

The battery charging controller 200 may detect when the controlled over-discharge operation is completed. The detection of completion may be based on a battery voltage, temperature, time, or some combination thereof. Completion may be determined when the battery voltage falls below a predetermined voltage that is less than the recommended cut-off voltage. The predetermined voltage may be close to zero volts. The controller 200 may prevent the battery voltage from falling below zero volts. Once the controlled over-discharge operation is completed, the resistor or other electrical load (e.g., 46 or 202) may be disconnected from across the battery terminals. The battery charging controller 200 may switch in the power source 36 for charging the battery 24. The charging equipment 38 may apply a voltage source across the terminals of the battery 24. The voltage and current may be controlled during the charging process. The charging rate may be varied during recharging. For example, a lower charging current may be initially applied while the battery 24 is over-discharged.

The procedure may be performed by the on-board controller 76 via a diagnostic request or automatically when the battery charge capacity falls below a predetermined threshold. Additional hardware may be added to the charging system 38 to incorporate one or more electrical loads 202 switched across the battery terminals. The electrical loads 202 may include a resistive element. Alternatively, other in-vehicle loads 46 may be operated to achieve the battery discharge. For example, a heating or cooling system may be operated to draw power from the battery 24. The on-board controller 76 may detect when the vehicle 12 is connected to a charging system 38 and may perform the procedure. Additional safeguards may be present in the vehicle 12 to prevent an operator from interrupting the process.

The battery charging procedure may be terminated when the battery 24 has reached a predetermined SOC value. The predetermined SOC may be approximately 100% but is not required to be.

The battery charging procedure may then optionally check the charge capacity of the battery 24 to determine the amount of charge capacity that has been restored. This may be accomplished by another controlled discharge. Battery charge capacity may be calculated as described above. The amount of restored charge capacity may be reported to an operator. In addition, the on-board battery controller 76 may be updated with the new battery charge capacity for later use. At some time, the battery charge capacity may be calculated to provide the new battery charge capacity. This calculation may be part of the battery controller 76 software.

To understand the physical mechanism for restoring battery charge capacity, the lithium-ion battery 24 may be analyzed. A lithium-ion battery 24 may be configured with a negative electrode and a positive electrode. The electrodes may be surrounded by an electrolyte substance which may allow ions to move between the electrodes. During discharge, lithium ions may move from the negative electrode to the positive electrode. During charging, lithium ions may move from the positive electrode to the negative electrode.

Battery aging effects may be attributed to side reactions that reduce the amount of cycleable lithium in the battery 24 and intrinsic capacity losses of the active materials. These processes may change the distribution and degrees of lithiation of the remaining cycleable lithium within the various active materials. This may lead to a change in overall cell capacity and a changing relationship between cell open-circuit voltage and state of charge.

Figure 4:
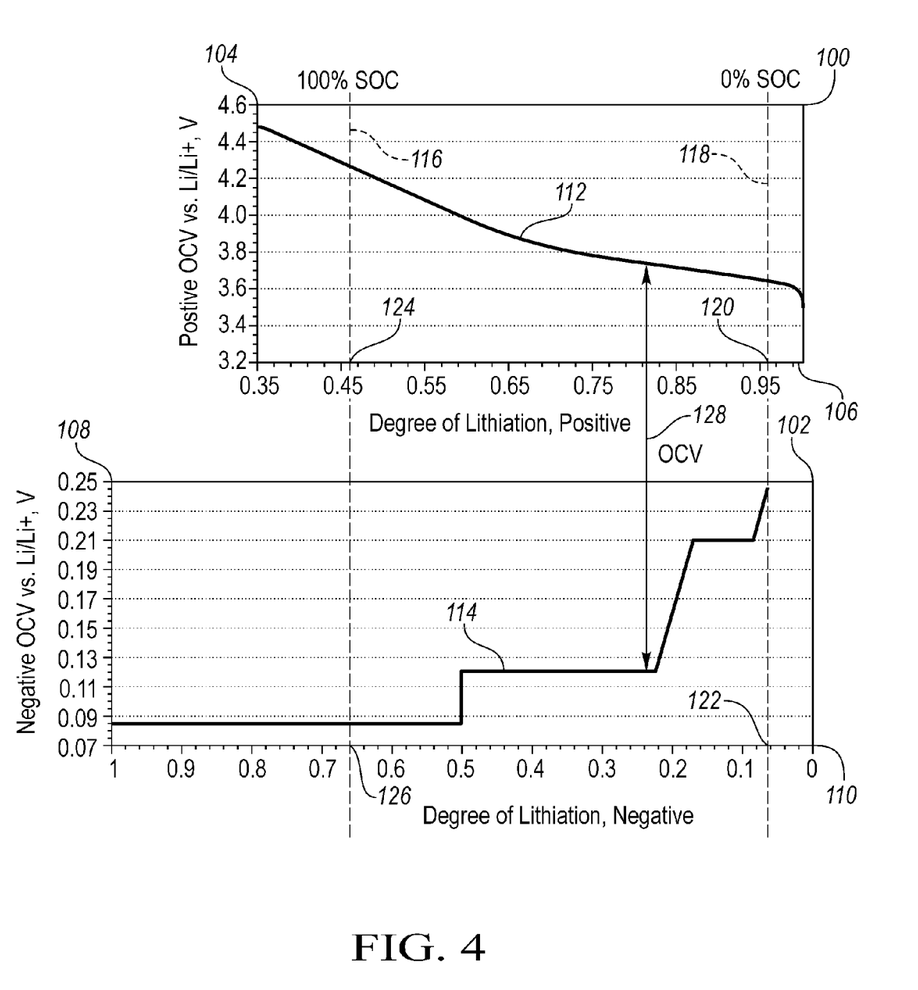
FIG. 4 is a graph illustrating the effect of degrees of lithiation for positive and negative electrodes of a battery on the open-circuit voltage.

FIG. 4 depicts possible reference voltage curves for the negative electrode 102 and the positive electrode 100. The open-circuit voltage values for each electrode are shown relative to a Li/Li+ reference electrode. The positive electrode open-circuit voltage curve 112 is depicted using a first y-axis 104 expressed as voltage relative to a Li/Li+ reference electrode and a first x-axis 106 as the degree of lithiation of the positive electrode. The negative electrode open-circuit voltage 114 is depicted using a second y-axis 108 expressed as voltage relative to a Li/Li+ reference electrode and a second x-axis 110 as the degree of lithiation of the negative electrode.

For a given state of charge value, there may be a particular degree of lithiation for the negative and positive electrodes. For example, at zero state of charge 118, the degree of lithiation for the positive electrode may be approximately 95% 120 and the degree of lithiation for the negative electrode may be approximately 8% 122. Similarly, at 100 percent state of charge 116, the positive electrode degree of lithation may be approximately 45% 124 and the negative electrode degree of lithiation may be approximately 66% 126. Note that each state of charge value may correspond to a pair of negative and positive electrode degrees of lithiation. At a given state of charge, the cell-open circuit voltage 128 may be the voltage difference between the positive and negative electrode. As the battery is charged and discharged, the degrees of lithiation of the electrodes may change accordingly.

The voltage for each electrode is a function of the degree of lithiation of the electrode. The degree of lithiation of an electrode may indicate the concentration of lithium at the electrode at a present operating point. The voltage value is a function of the concentration of lithium in the electrode. The concentration of lithium in each electrode may change as the battery is charged and discharged. The degree of lithiation may be expressed as a percentage of the total possible lithiation for the electrode. The open-circuit voltage of the cell 128 corresponds to a particular pair of degrees of lithiation of the positive and negative electrodes. That is, the cell open-circuit voltage 128 is the difference between the positive electrode reference voltage and the negative electrode reference voltage at a given operating point. The degrees of lithiation for the negative and positive electrodes may be a function of the cell formation conditions and the particular point in life of the cell. The relationship between the cell open-circuit voltage and the state of charge is the voltage difference between the positive and negative electrodes within a certain composition range defined by the voltage limits.

After cell formation, the cell may have a particular relationship between open-circuit voltage and state of charge. An open-circuit voltage corresponding to zero state of charge 118 may be chosen. An open-circuit voltage corresponding to 100 percent state of charge 116 may also be chosen. This may determine an initial relationship for the relative degrees of lithiation between the electrodes. Over the life of a battery cell, the open-circuit voltage curves may shift relative to one another. The shifting of the open-circuit voltage curves may be from the cumulative effect of parasitic reactions through the aging process. As parasitic reactions consume lithium ions, fewer lithium ions may be cycled between the electrodes. The curves (112, 114) may also shrink (e.g., compressed x-axis) which is related to the relative losses of active material over battery life and may be reflected in a changing ratio of negative to positive.

As the negative electrode curve 102 shifts to the left as the battery ages, the battery charge capacity may decrease. This may be visualized by moving the negative electrode curve 114 and the second x-axis 110 to the left relative to the first x-axis 106. At the point corresponding to zero state of charge 118, the negative electrode may be fully delithiated (e.g., concentration of lithium is zero). In such a case, the concentration of lithium in the positive electrode may not be able to increase to affect the cell open-circuit voltage. In addition, movement of the negative open-circuit voltage toward the left may affect when the zero state of charge is detected. The voltage may become less than the voltage associated with zero state of charge at a higher lithium concentration of the positive electrode. Battery controls may interpret this voltage and stop discharging as the battery controller may prefer not to discharge below zero state of charge. As the battery ages, the relative degrees of lithiation for the positive and negative electrodes for a given state of charge may change from the original pairs of lithiation degrees.

A substantial degree of charge capacity loss throughout battery cell life may be attributed to parasitic solvent-reduction reactions at the negative electrode that change the relative degrees of lithiation between the positive and negative electrodes. For example, after a 1-C discharge, the negative electrode may be nearly fully delithiated, yet the positive electrode may be relatively far from full lithiation. As there may be excess solvent, as well as solvated lithium ions, in the electrolytic fluid, the possibility exists that the excitation of solvent oxidation (or other parasitic reactions) at the negative electrode may result in the restoration of the original degrees of lithiation of the electrodes (i.e., capacity recovery). Parasitic oxidation reactions at the negative electrode may occur when the cell is fully discharged because lithium extraction ceases when the negative electrode is fully delithiated.

Physical principles may govern the open-circuit voltages for mixed materials. The open-circuit voltage for a first and second material in direct ionic and electrical communication with each other will electrochemically react in such a way as to equilibrate the open-circuit voltage of the materials to each other. The total amount of cycleable lithium may remain fixed (assuming no side reactions) regardless of whether the materials are in contact. As a result, the lithium leaving one of the materials shows up as lithium added to the other. The lowering of the lithium concentration in the first material raises the potential of the first material. At the same time, the rise in concentration in the second material lowers the potential of the second material. The process may continue until the two open-circuit voltages become equal. Charging and discharging of the cell causes cycling of lithium ions between the electrodes.

Upon over-discharge, the negative electrode may be fully delithiated based on an open-circuit voltage model that indicates that the cell is negative limited on discharge. The negative electrode may find another oxidation reaction to provide the over-discharge current which may be copper (Cu) dissolution or solvent oxidation (with $CO_2$, $CO$, and $O_2$ likely being the gaseous products). The open-circuit voltage model indicates that the positive electrode may not be fully lithiated (at 0% SOC) and therefore the over-discharge reaction at the positive electrode would likely be a discharge reaction of lithium intercalation.

There is a possibility that over-discharge could result in dissolution of the copper current-collecting material of the negative electrode. It may be possible to avoid copper dissolution as standard reduction potentials indicate that copper is relatively stable in this system with a standard reduction potential is 3.5 V from Li/Li+. Referring to FIG. 4, the negative electrode open-circuit voltage v. Li/Li+ characteristic is well below 3.5V even when fully discharged. When the voltage of the negative electrode exceeds 3.5V, copper dissolution may be possible.

By controlling the over-discharge, the voltage and temperature may be controlled to avoid copper dissolution while allowing the lithiation of the positive electrode to rejuvenate the cell capacity.

Over-discharge is generally considered to be abusive or destructive to a battery cell. The method described is a "controlled over-discharge" to excite parasitic oxidation reactions (i.e., solvent oxidation) at the negative electrode. The over-discharge reaction at the positive electrode may be lithium insertion because the positive electrode is not fully lithiated. The positive electrode can accept more lithium via the discharge reaction, thus increasing cell capacity. The method attempts to restore the relative degrees of lithiation between the positive and negative electrodes.

FIG. 5 shows one possible apparatus for implementing the controlled over-discharge procedure. The components may be incorporated into the EVSE 38 or may be implemented as a separate module. An off-board electrical load 202 may be included. The off-board electrical load 202 may be coupled to the EVSE connector 40 through a switch 208. The off-board electrical load 202 may be a resistor. The switch 208 may be controlled by a controller 200. The switch 208 may be a relay or solid-state device and the controller 200 may include a control output 216 to operate the switch 208.

A power output module 204 may be included that may condition power from the power source 26 to the proper form for providing to the vehicle. The power output module 204 may connect to the EVSE connector 40 through a second switch 206. The second switch 206 may also be controlled from a control output 218 of the controller 206. In normal operation, the controller 200 may be configured to close one of the switches (206, 208) at a given time.

The controller 200 may include an electrical load control output 214 for controlling the off-board electrical load 202. The controller 200 may include a power output module control output 212 for controlling the power output module 204. The controller 200 may execute logic for controlled discharge of the traction battery 24 followed by recharging of the traction battery 24.

The controller 200 may include a control signal interface 210 with the EVSE connector 40. The control signal interface 210 may be a connection through the charge port 34 to exchange control information with the power conversion module 32 and the traction battery 24. For example, the control signal interface 210 may be a serial communications link through which the traction battery 24 and the controller 200 may exchange data and control signals. For example, the traction battery 24 (or controller 76 within the traction battery 24) may send battery power capability and voltage information through the control signal interface 210.

Figure 6:
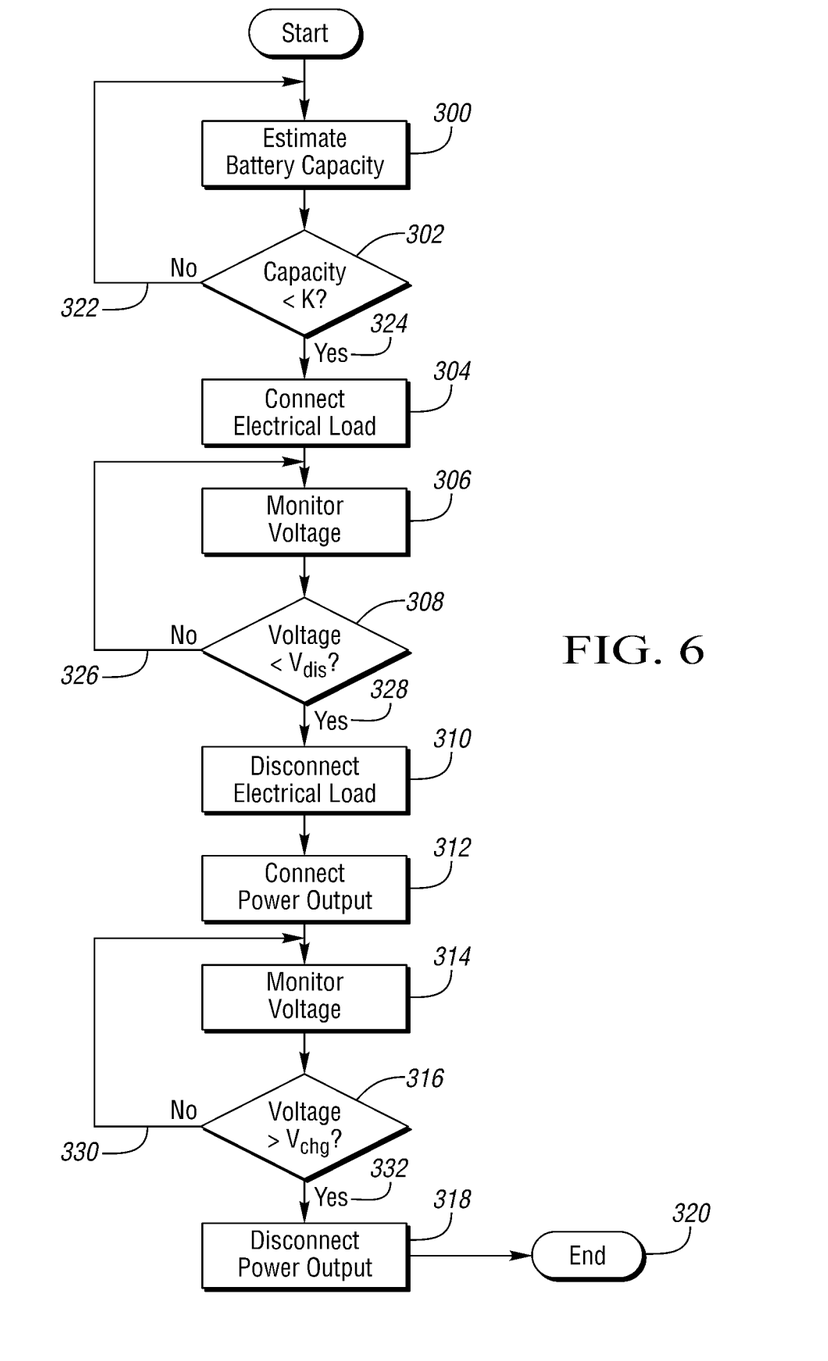
FIG. 6 is a flowchart illustrating a possible controller-implemented method for increasing the maximum capacity of a battery.

FIG. 6 illustrates a flowchart for a possible method for rejuvenating battery charge capacity in a lithium-ion battery. The controller 200 may implement a first operation 300 to estimate the battery charge capacity 300. Any existing technique for calculating battery charge capacity may be utilized. The controller 200 may implement operation 302 in which the battery charge capacity may be checked to determine if the battery charge capacity is less than a threshold, K. Logic path 322 may be followed if the battery charge capacity is greater than or equal to the threshold, K, and the system may continue to estimate battery charge capacity as in operation 300. Alternatively, execution may end as the rejuvenation procedure may not be needed. Logic path 324 may be followed if the battery charge capacity is less than the threshold, K, and the controller 200 may transition to operation 304 in which the electrical load 202 is connected to the traction battery 24. Connecting the electrical load 202 may cause a controlled discharge of the traction battery 24. The controller 200 may then execute operation 306 in which the controller may measure and monitor the voltage of the battery 24. The off-board controller 200 may measure the actual voltage or may receive voltage data from the on-board controller 76. The controller 200 may execute operation 308 in which the battery voltage may be checked to determine if the voltage is less than a predetermined discharge voltage, $V_{dis}$. Logic path 326 may be followed if the voltage is greater than or equal to the predetermined discharge voltage, in which case operation 306 is repeated. Logic path 328 may be followed if the voltage is less than the predetermined discharge voltage and operation 310 may be executed. In operation 310, the electrical load 202 may be disconnected from the traction battery 200.

At operation 312, the power output module 204 may be connected to initiate recharging of the battery 24. At operation 314, the voltage during charging may be monitored. At operation 316, the voltage may be checked to determine if the voltage is greater than a predetermined charging voltage, $V_{chg}$. Logic path 330 may be followed if the voltage is less than the predetermined charging voltage, and operation 314 may be repeated. Logic path 332 may be followed if the voltage is greater than the predetermined charging voltage. At operation 318, the power output module 204 may be disconnected from the battery 24. Charging may be completed and the process may be stopped at operation 320.

The logic described by the flowchart may be executed by the off-vehicle (e.g., part of a charger) controller 200 or the on-vehicle (e.g., part of traction battery system) controller 76. The controller (e.g., 76 or 200) may include appropriate interfaces for controlling the various components.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for operating a lithium-ion battery comprising:
   in response to a loss of battery charge capacity greater than a predetermined loss, discharging, by a controller, the battery to a predetermined voltage less than a voltage associated with zero state of charge such that relative degrees of lithiation associated with positive and negative electrodes of the battery change for at least one state of charge resulting in an increase in the battery charge capacity.

2. The method of claim 1 wherein the predetermined voltage is greater than zero volts by a predetermined amount.

3. The method of claim 1 wherein the predetermined loss is a predetermined percentage of a beginning of life battery charge capacity.

4. The method of claim 1 wherein a current for discharging the battery is substantially less than a rated current of the battery.

5. The method of claim 1 further comprising connecting, by the controller, a power source to the battery and charging the battery to a voltage that is a predetermined amount greater than the voltage associated with zero state of charge.

6. A vehicle comprising:
   a battery including a plurality of lithium-ion cells with associated positive and negative electrodes; and
   at least one controller programmed to discharge the battery through an electrical load to a predetermined voltage less than a voltage associated with zero state of charge such that relative degrees of lithiation associated with the electrodes of the battery change for at least one state of charge resulting in an increase in battery maximum capacity.

7. The vehicle of claim 6 further comprising an engine and a generator coupled to the engine, and wherein the at least one controller is further programmed to, in response to the voltage of the battery being less than the predetermined voltage, operate the generator and the engine to charge the battery until the voltage of the battery is a predetermined amount greater than the voltage associated with zero state of charge.

8. The vehicle of claim 6 further comprising a charge port connecting an external power source to the vehicle, and wherein the at least one controller is further programmed to operate the external power source to charge the battery until the voltage of the battery is a predetermined amount greater than the voltage associated with zero state charge.

9. The vehicle of claim 8 wherein the charge port connects the electrical load to the vehicle.

10. The vehicle of claim 6 further comprising one or more of a resistor, a heater, a compressor, and a motor, connectable to the battery as the electrical load.

11. The vehicle of claim 6 wherein the predetermined voltage is greater than zero volts by a predetermined amount.

12. The vehicle of claim 6 wherein the at least one controller is further programmed to discharge the battery in response to a loss of battery maximum capacity greater than a predetermined loss.

13. An apparatus for operating a lithium-ion battery comprising:
at least one controller programmed to connect an electrical load to the battery and discharge the battery to a predetermined voltage less than a voltage associated with zero state of charge such that relative degrees of lithiation associated with positive and negative electrodes of the battery change for at least one state of charge resulting in an increase in battery maximum capacity.

14. The apparatus of claim 13 further comprising a power output selectively connectable to the battery, and wherein the at least one controller is further programmed to, disconnect the electrical load, and connect the power output to the battery and recharge the battery using the power output until a battery voltage is a predetermined voltage greater than the voltage associated with zero state of charge.

15. The apparatus of claim 13 wherein an impedance of the electrical load is selected such that a current is substantially less than a rated current of the lithium-ion battery.

16. The apparatus of claim 13 wherein the predetermined voltage is greater than zero volts by a predetermined amount.

17. The apparatus of claim 13 wherein the at least one controller is further programmed to connect the electrical load in response to a loss of battery maximum capacity greater than a predetermined loss.

18. The apparatus of claim 17 wherein the predetermined loss is a predetermined percentage of a beginning of life battery charge storage capacity.

19. The apparatus of claim 13 wherein the at least one state of charge is zero state of charge.

20. The apparatus of claim 13 wherein the at least one controller is further programmed to connect the electrical load in response to a battery state of charge being less than a predetermined state of charge.

* * * * *